Patented July 5, 1932

1,865,451

UNITED STATES PATENT OFFICE

LEWIS BENAJAH ALLYN, OF WESTFIELD, MASSACHUSETTS, ASSIGNOR TO VITAMIN FOOD CO. INC., OF NEW YORK, N. Y., A CORPORATION OF DELAWARE

EVAPORATION OF SEA WATER

No Drawing. Application filed May 2, 1928. Serial No. 274,678.

This invention relates to the preparation of compounds containing sea-water salts, and is particularly concerned with a method of evaporating sea water to produce a product containing all the salts found in sea-water and especially rich in iodine, bromine and the other volatile salts found in sea-water.

In the evaporation of sea water in accordance with existing commercial practice, the water is either evaporated by the artificial application of heat or is pumped into beds and evaporated by the action of the sun. Either of these processes collect the sodium chloride from the sea water well enough but neither one produces enough of the iodine, bromine and other salts, which, being volatile, pass off when heated, due to the acidity of the sea water.

I have discovered that by the addition of bicarbonate of soda to the sea-water, in the amount of, say one-half of one per cent of sodium bicarbonate, or in an amount sufficient to produce and maintain in the process of evaporation a hydrogen ion concentration representing a $P_h$ of from say 7.5 to 8.0, and at any rate in an amount sufficient to render the water alkaline, that the evaporation can be conducted so as to retain substantially all of the salts contained in the unevaporated sea-water in the finished product and in the same proportions as contained in the sea water.

In my practice, therefore, I add the bicarbonate of soda as described and then proceed with any of the recognized processes usually employed in the evaporation of the water.

It is customary in the processes for evaporating sea water to first conduct a partial evaporation, that is, to evaporate out a major portion of the sodium chloride instead of evaporating to complete dryness, thus leaving a residual liquor. This liquor may still contain substantial quantities of the iodine, bromine and other rare salts, and the present invention also contemplates proceeding in this manner to form a residual liquor containing very little sodium chloride but all the volatile salts. This residual liquor can then be further evaporated with sodium bicarbonate to form a residue poor in sodium chloride and rich in the other salts, or else can be added back to the next batch of sea-water to be treated. In my preferred practice, however, I add this residual liquor back to the next batch of sea-water to be evaporated and then proceed with the regular evaporation as initially disclosed above.

I do not limit myself to the use of sodium bicarbonate, but may use any other alkaline agent which may suitably give the degree of alkalinity described.

I claim:

1. As an improvement in the evaporation of sea water, the method consisting of the addition of an alkaline substance so as to retain the other salts contained in the sea water along with the sodium chloride.

2. As an improvement in the evaporation of sea water, the process whereby the other salts contained in the water are preserved along with the sodium chloride through the addition of bicarbonate of soda.

3. As an improvement in the evaporation of sea water, the method consisting of the addition of an alkaline substance so as to preserve the iodine contained in the sea water along with the sodium chloride and other salts.

4. The evaporation of sea water or other water with an alkaline substance so as to preserve and retain iodine and other volatile salts.

In testimony whereof I affix my signature.

LEWIS BENAJAH ALLYN.